(12) United States Patent
Schantz et al.

(10) Patent No.: US 9,235,275 B2
(45) Date of Patent: Jan. 12, 2016

(54) STYLUS GRIP

(71) Applicant: Lenovo (Singapore) Pte. Ltd., Singapore (SG)

(72) Inventors: Daniel Jordan Schantz, Raleigh, NC (US); Karen Ruth Kluttz, Raleigh, NC (US); Christopher Miles Osborne, Cary, NC (US); Scott Edwards Kelso, Cary, NC (US); Michaela Rose Case, Raleigh, NC (US); Howard J. Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 53 days.

(21) Appl. No.: 13/944,597

(22) Filed: Jul. 17, 2013

(65) Prior Publication Data

US 2015/0022464 A1    Jan. 22, 2015

(51) Int. Cl.
G06F 3/0354    (2013.01)
G06F 1/16    (2006.01)

(52) U.S. Cl.
CPC .......... *G06F 3/03545* (2013.01); *G06F 1/1626* (2013.01); *G06F 2200/1632* (2013.01)

(58) Field of Classification Search
CPC ... G06F 3/033; G06F 3/03542; G06F 3/0354; G06F 3/03545; B43K 23/00; B43K 23/008
USPC ................................ 345/173, 179; 178/19.01
See application file for complete search history.

(56) References Cited

U.S. PATENT DOCUMENTS

| | | | | |
|---|---|---|---|---|
| 5,750,939 | A * | 5/1998 | Makinwa et al. | 345/179 |
| 5,988,908 | A * | 11/1999 | Kageyama et al. | 401/6 |
| 6,019,534 | A * | 2/2000 | Heins | 401/6 |
| 6,249,276 | B1 * | 6/2001 | Ohno | 345/179 |
| 2005/0286962 | A1 * | 12/2005 | Cheng | 401/6 |

* cited by examiner

*Primary Examiner* — Regina Liang
(74) *Attorney, Agent, or Firm* — Brian J. Pangrle

(57) ABSTRACT

An apparatus can include a processor; memory operatively coupled to the processor; a touchscreen display operatively coupled to the processor; a stylus that includes a first axial end, a second axial end and an axially translatable grip; and a housing that includes a stylus socket for docking the stylus. Various other apparatuses, systems, methods, etc., are also disclosed.

18 Claims, 9 Drawing Sheets

STYLUS GRIP

TECHNICAL FIELD

Subject matter disclosed herein generally relates to styli for computing devices.

BACKGROUND

Various types of devices may include a stylus, for example, to facilitate input. A user may favor an ergonomically dimensioned stylus over a stylus that may be deemed too thin and uncomfortable to hold or manipulate. Various technologies and techniques described herein pertain to styli.

SUMMARY

An apparatus can include a processor; memory operatively coupled to the processor; a touchscreen display operatively coupled to the processor; a stylus that includes a first axial end, a second axial end and an axially translatable grip; and a housing that includes a stylus socket for docking the stylus. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

Figure 1:
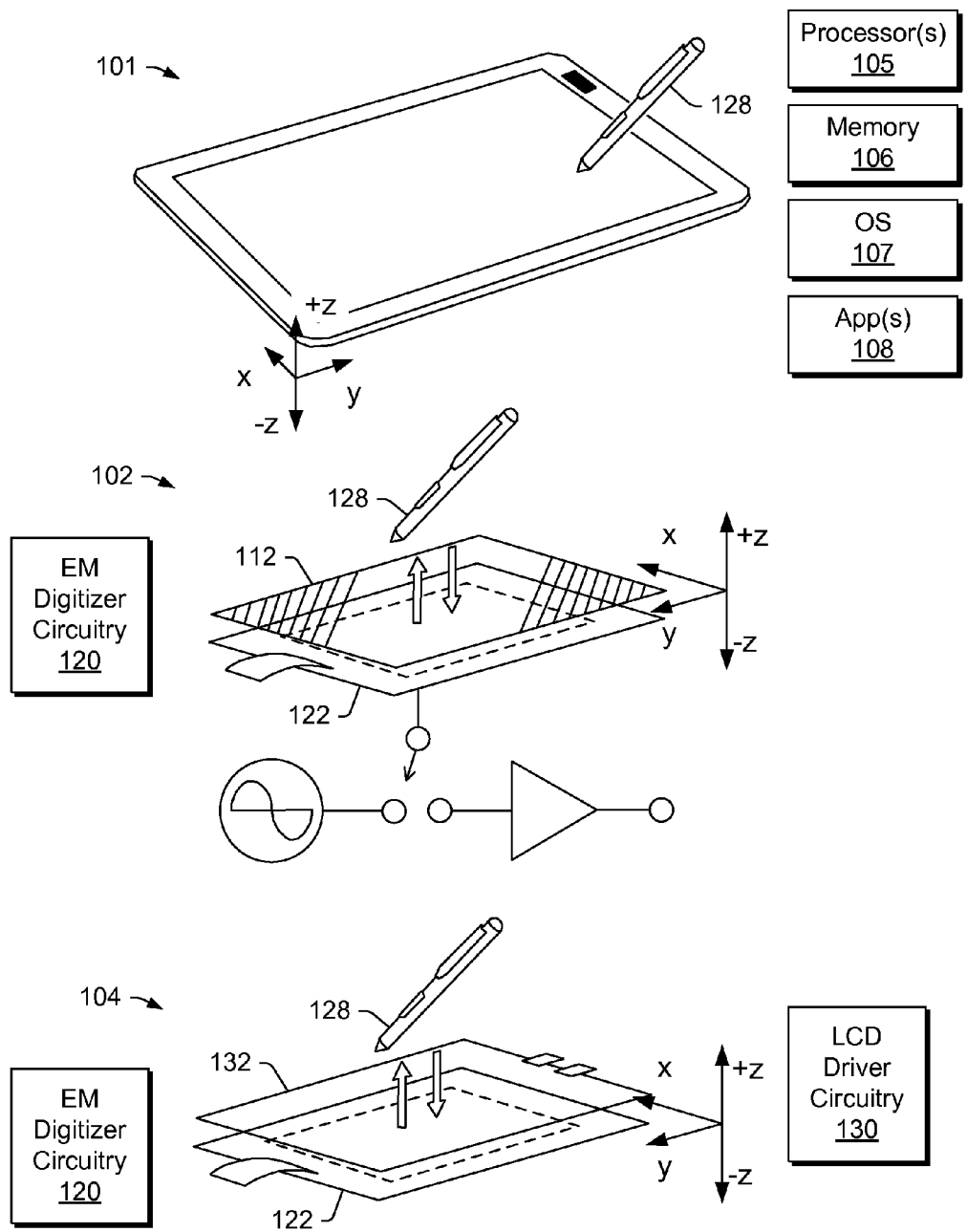
FIG. 1 is a series of diagrams of an example of a device and examples of arrangements of components that may be included in such a device.

The following description includes the best mode presently contemplated for practicing the described implementations. This description is not to be taken in a limiting sense, but rather is made merely for the purpose of describing general principles of various implementations. The scope of invention should be ascertained with reference to issued claims.

Various types of computing devices that include one or more processors, memory and a display may be characterized by one or more form factors. For example, various components of a computing device may have associated form factors (e.g., motherboard, chassis, etc.) and a computing device itself may have an associated form factor (e.g., notebook, tablet, etc.). As an example, a notebook computing device form factor may be specified as including an "A portion" (e.g., that includes a display) and a "B portion" (e.g., that includes a keyboard) where the two portions are coupled via one or more hinges and where each portion may be further specified by a length, a width and a height (e.g., or depth). As an example, a tablet computing device form factor may be specified by a length, a width and a height (e.g., or depth). As an example, a tablet computing device form factor may be referred to, at times, as a "pad" (e.g., or a "pad tablet", etc.).

Tablet computing devices may be quite thin, for example, a tablet computing device may have a depth of about 7 mm. For sake of comparison, a standard, hexagonal, #2 pencil may have a hexagonal height of about 6 mm (e.g., a corresponding outer diameter of about 7 mm). Where a tablet computing device is configured for input via a stylus, such a stylus may be dimensioned similarly to a pencil or a pen, for example, for user adaptation, familiarity, etc. Where a tablet computing device is configured for storage (e.g., docking) of a stylus, depth of the device may be a factor when determining dimensions, shape, etc. of a stylus. For example, to dock a stylus in a tablet computing device with a 7 mm depth, a corresponding stylus dimension (e.g., a cross-sectional dimension) may be about 5 mm or less (e.g., less than a standard, hexagonal, #2 pencil).

As an example, an apparatus can include a processor, memory operatively coupled to the processor, a touchscreen display operatively coupled to the processor, a stylus that includes a first axial end, a second axial end and an axially translatable grip and a housing that includes a stylus socket for docking the stylus. In such an example, the stylus may have a cross-sectional dimension of about 7 mm or less and the grip may be conformable for ergonomic comfort to grip the stylus, for example, conformable to have a cross-sectional dimension of about 7 mm or more (e.g., up to about 8.5 mm or more). As an example, a grip may be translatable axially along a shaft of a stylus (e.g., from an axial position for storage to an axial position for use).

As an example, a grip may be placed around a stylus where the stylus has a small core thickness (e.g., a shaft thickness) that may be readily received by a stylus socket of a thin tablet computing device (e.g., placed inside the device). In such an example, the grip, which includes a larger thickness, can slide toward a tip end of the stylus (e.g., a pointing end) when in use to provide a larger diameter surface for a user to hold the stylus. As an example, the grip may slide toward an opposing end of the stylus when docking the stylus, for example, allowing the thinner core to be placed inside a housing of the tablet computing device (e.g., in a stylus socket). Such a grip may be an axially translatable grip that translates along an axial length of a stylus to a position for use and to another position for docking (e.g., storage) in a housing of a device. As an example, a grip itself may be expandable and contractible, for example, to expand to a comfortable size for holding when outside a housing and to contract to fit at least partially inside the housing. Such an approach may allow a tablet computing device to maintain an aesthetic appeal when a stylus is docked, as well as the ergonomic comfort when using the stylus for input (e.g., via a touchscreen, etc.).

FIG. 1 shows an example of a device 101 and examples of arrangements of panels 102 and 104 that may, for example, be included in the device 101. Each of the arrangements 102 and 104 is shown along with a Cartesian coordinate system that includes x, y and z axes. Various features of the arrangements 102, 104 and 106 may be described with respect to the Cartesian coordinate system. For example, length (e.g., along a y-axis), width (e.g., along an x-axis), depth (e.g., along a z-axis), aspect ratios, relationships between features, etc. may be described with respect to the Cartesian coordinate system.

In FIG. 1, the device 101 includes one or more processors 105, memory 106, an operating system 107 (e.g., or operating systems) and one or more applications 108. In the example of FIG. 1, a stylus 128 may be used to input information such as, for example, commands, selections, digital ink, etc. As an example, an operating system environment may be established by executing instructions of the operating system 107 stored in the memory 106 of the device 101 using at least one of the one or more processors 105. In such an example, the operating system environment may call for rendering information to a display, receiving and processing input from a surface using a stylus, etc. As an example, an application may be executable in an established operating system environment, for example, to provide for drawing, handwriting recognition, photo editing, etc. through, in part, use of a stylus.

In FIG. 1, the example arrangement 102 includes a flat panel 112, an electromagnetic digitizer panel 122, the stylus 128 and electromagnetic digitizer circuitry 120. In the arrangement 102, energy is induced in a resonant circuit of the stylus 128 by a field generated by the electromagnetic digitizer panel 122. The resonant circuit of the stylus 128 then makes use of this energy to return a signal to the electromagnetic digitizer panel 122 where input signals may determine, for example, one or more of coordinate position, angle, speed, writing pressure, etc. As shown in FIG. 1, circuitry may be configured to switch a field on and off and to receive input signals.

As an example, an electromagnetic digitizer panel may include a sheet manufactured from glass epoxy resin or from a polyimide and PET formed film in which a large number of overlapping loop coils are arranged in a matrix in the x and y axis directions.

As an example, the circuitry 120 may discharge alternating current to selected loop coils from among the array of the electromagnetic digitizer panel 122 to excite the coils, causing them to generate fields. When the stylus 128 passes through these fields, it may pick up and store energy in a resonant circuit. As an example, the circuitry 120 may detect an approximate location of the stylus 128, for example, by scanning the loop coils, which may include scanning multiple loop coils in the vicinity of approximate location of the stylus 128 to determine coordinate values more precisely.

In the arrangement 102, location of the stylus 128 may be determined, for example, where the stylus 128 may be positioned a short distance from the electromagnetic digitizer panel 122 (e.g., an effective operational distance).

As an example, the circuitry 120 may include a DSP circuit for processing input. As an example, the circuitry 120 may be operatively coupled to a processor of a device (e.g., CPU, etc.). As an example, the circuitry 120 may include a DSP circuit and be operatively coupled to a processor of a device.

In FIG. 1, the example arrangement 104 includes the electromagnetic digitizer panel 122 and a LCD flat panel display 132 with associated LCD driver circuitry 130. As an example, the LCD driver circuitry may include one or more features of circuitry such as that of the Samsung WiseView™ driver circuitry or other suitable driver circuitry. While LCD may be an acronym for "liquid crystal display", LCD finds uses as "LCD display", for example, as an adjective for "display" (e.g., a type of display).

Figure 2:
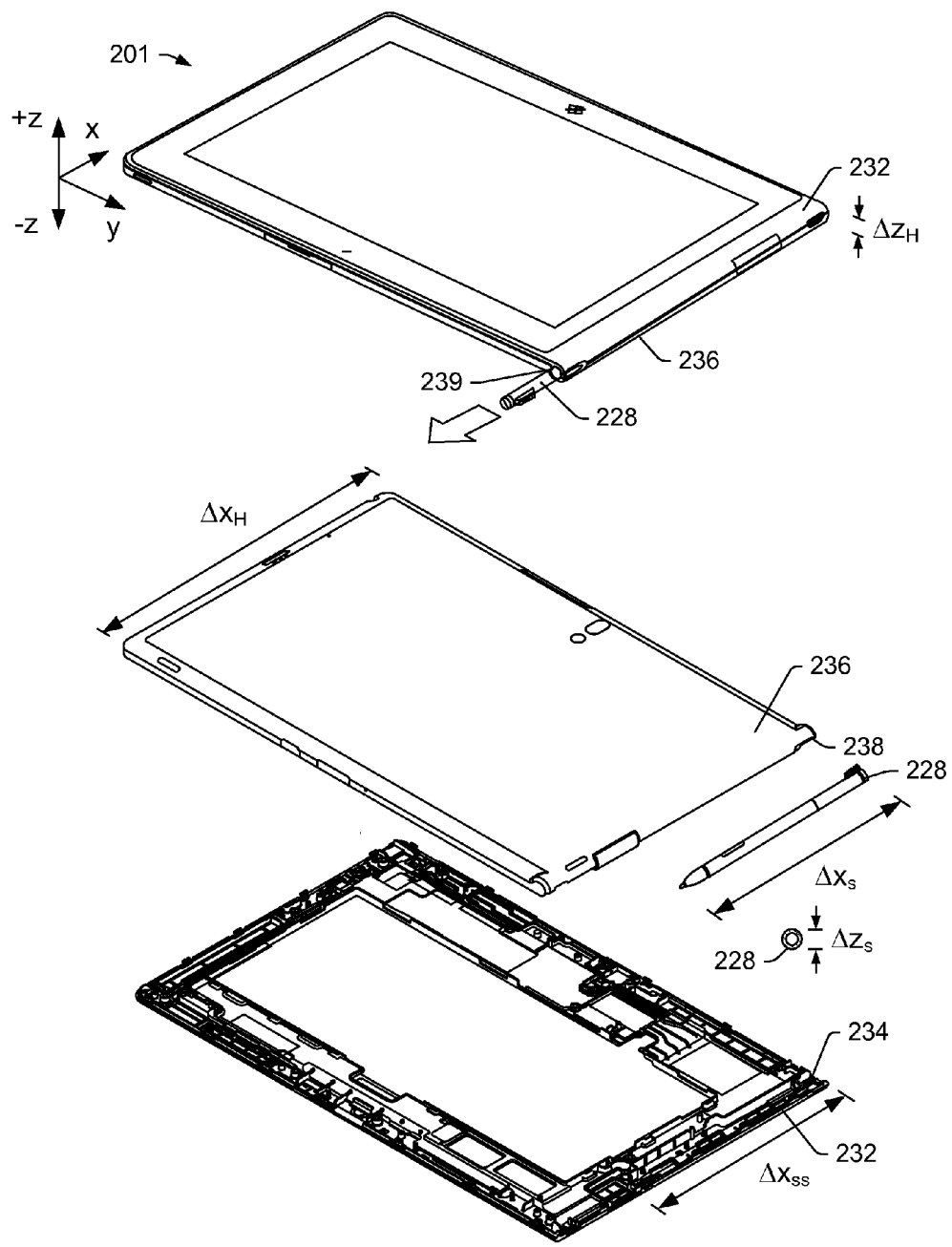
FIG. 2 is a series of diagrams of an example of a device that includes a stylus and a housing with a stylus socket.

FIG. 2 shows an example of a device 201 that includes a housing formed at least in part by a front side or display side piece 232 and a back side piece 236. In the example of FIG. 2, the pieces 232 and 236 form a stylus socket that includes an opening 239 (e.g., along an edge in a y,z-plane). As shown, a stylus 228 may be translated into and out of the stylus socket via the opening 239. As an example, the stylus 228 may include a circular cross-section with a cross-sectional dimension (e.g., $\Delta z_s$ or $D_s$) that is less than a housing depth of the device 201 (e.g., $\Delta z_H$). As an example, the stylus 228 may include an axial length (e.g., $\Delta x_s$) that is accommodated by a length of the stylus socket (e.g., $\Delta x_{ss}$), which may be a fraction of a dimension of the housing of the device 201 (e.g., $\Delta x_H$). As an example, a stylus may include circuitry and optionally one or more buttons or other actuation mechanisms, for example, selectably actuatable by a user.

Figure 3:
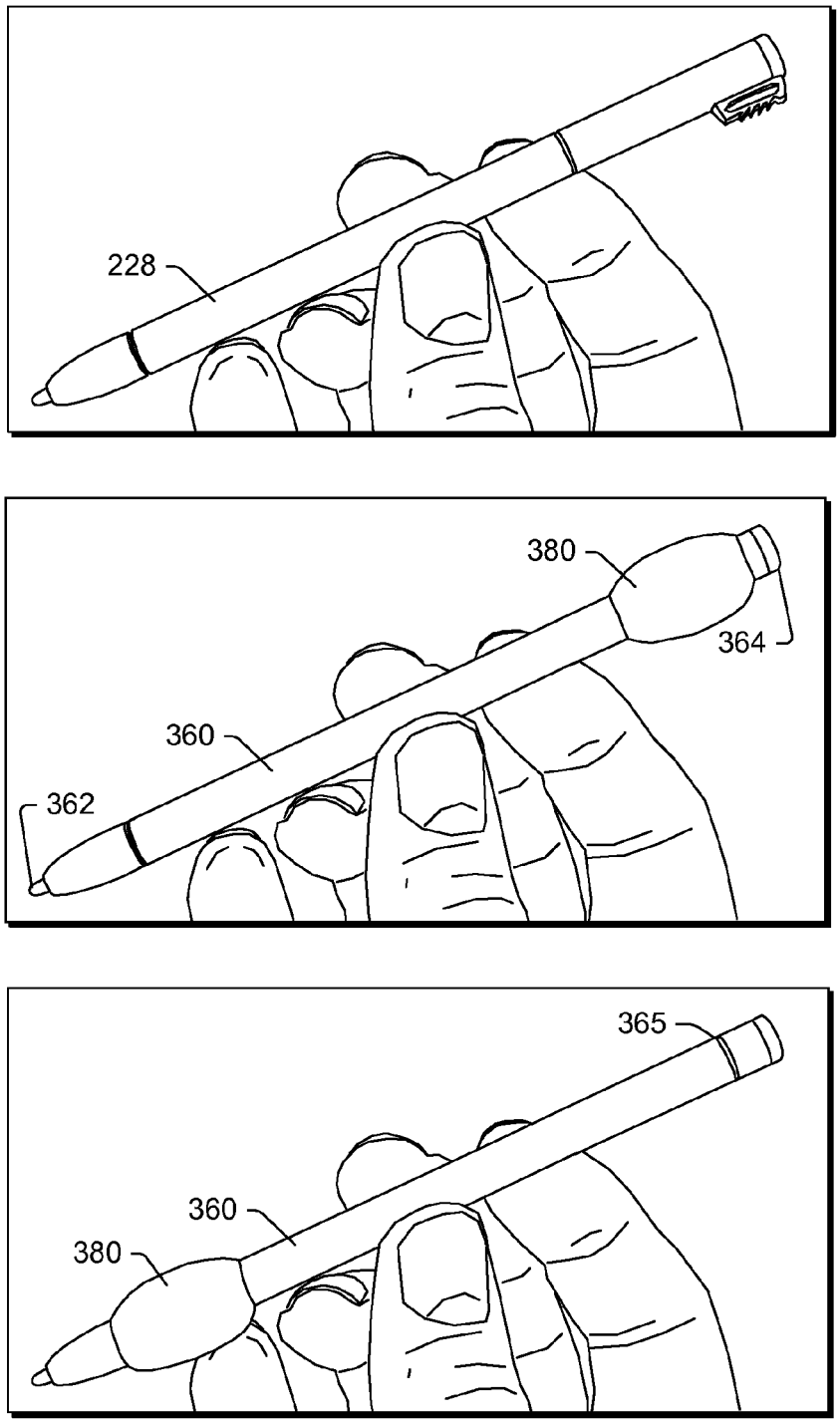
FIG. 3 is a series of diagrams of examples of styli.

FIG. 3 shows an enlarged, perspective view of the stylus 228 of FIG. 2 as well as perspective views of an example of a stylus 360 with an axially translatable grip 380. A portion of a human hand including its five fingers is shown for illustrating approximate relationships between finger size and size of the styli 228 and 360.

In the example of FIG. 3, the stylus 360 includes a first axial end 362 (e.g., a tip end) and a second axial end 364 (e.g., a butt end). As shown, the axially translatable grip 380 may be translated axially along the stylus 360. As an example, the stylus 360 may optionally include an annular groove 365, which may cooperate with a feature of the grip 380 (e.g., a neck that may fit at least partially into the annular groove). In such an example, the annular groove 365 may increase frictional force between the stylus 360 and the grip 380, for example, for one or more purposes (e.g., to help shape the grip 380, to help retain the grip 380 on the stylus 360, etc.).

As an example, a grip may be made of or include an elastomeric material such as natural rubber and/or synthetic rubber. As an example, a grip may include a shell (e.g., made of plastic or other material) that contains fluid and/or solids. In such an example, the shell may be deformable and allow for compression, flow, movement, etc. of fluid and/or solids within the shell (e.g., for deformation of the grip). As an example, a grip may include cross-linked molecules, suspended solids, etc. As an example, a paste may behave somewhat like a solid and flow upon application of a sufficient load or stress. As an example, a grip may include a deformable shell that contains solid particles (e.g., sand, etc.). As an example, a grip may be described by one or more properties (e.g., rheological properties, chemical properties, etc.).

Figure 4:
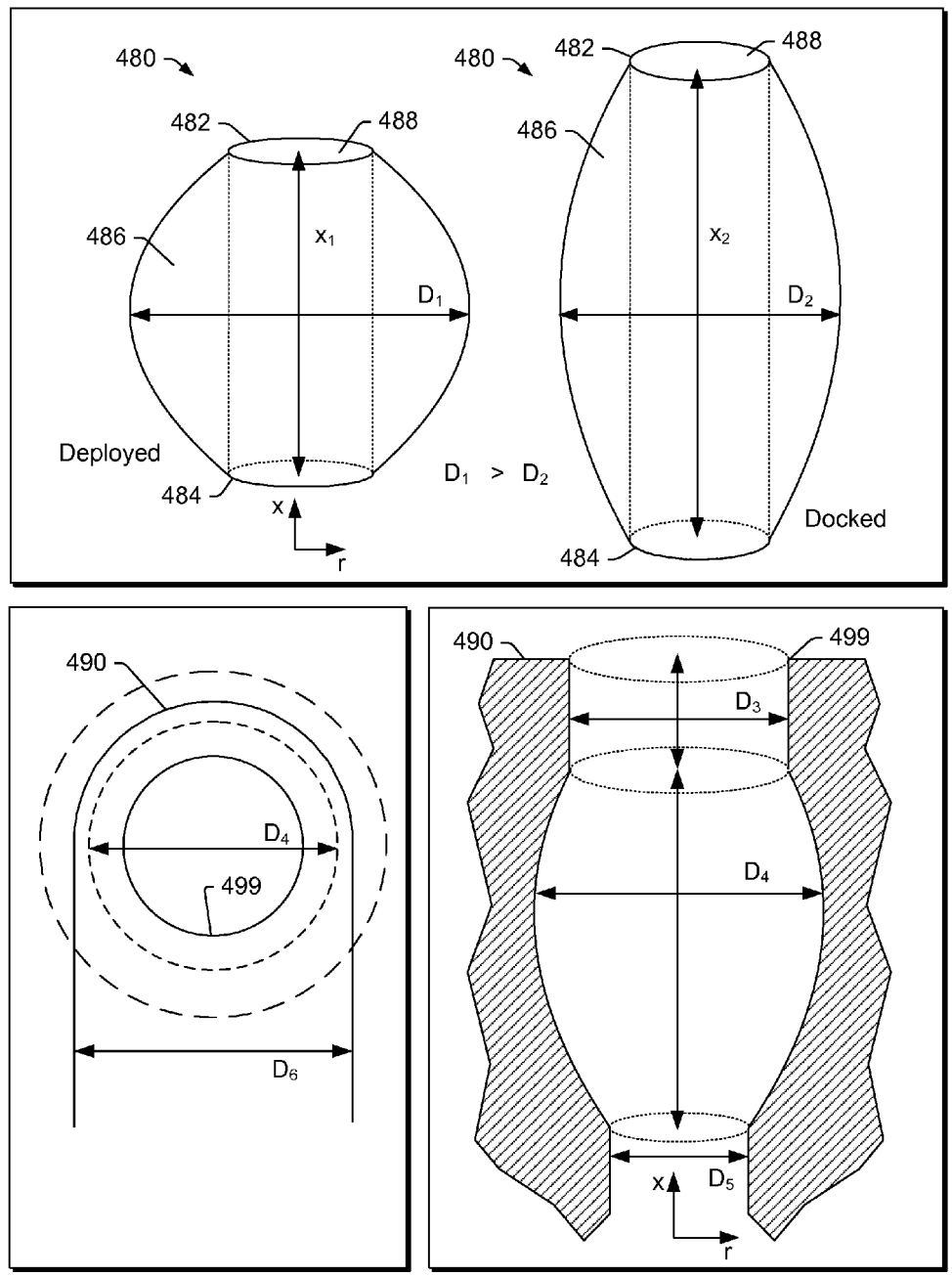
FIG. 4 is a series of diagrams of an example of a stylus grip and an example of a housing with a stylus socket.

FIG. 4 shows an example of a grip 480 and an example of a housing 490. As shown, the grip 480 may have a deployed shape and a docked shape where a cross-sectional dimension of the deployed shape ($D_1$) exceeds a cross-sectional dimension of the docked shape ($D_2$). As shown, the grip 480 includes opposing axial ends 482 and 484, an outer surface 486 and an inner surface 488. As shown, the grip 480 is deformable such that lengthening (e.g., stretching) of the grip 480 along an axial dimension (x) causes the grip 480 to contract along a radial dimension (r). As an example, the grip 480 may be made of a deformable material, be made of a deformable shell that contains material, etc.

In FIG. 4, the deployed shape of the grip 480 may correspond to a deployed shape of the grip 480 as fit to a stylus (e.g., in contact with the inner surface 488) when the stylus is not docked in a housing; whereas, the docked shape of the grip 480 may correspond to a docked shape of the grip as fit to a stylus (e.g., in contact with the inner surface 488) when the stylus is docked in a housing.

In FIG. 4, the housing 490 includes a stylus socket with an opening 499 that includes a cross-sectional dimension ($D_3$) that is less than the cross-sectional dimension ($D_2$) of the docked shape of the grip 480. As shown, the stylus socket of the housing 490 also includes a grip socket portion with a cross-sectional dimension ($D_4$) that is approximately equal to the cross-sectional dimension ($D_2$) of the docked shape of the grip 480. As an example, the shape of the grip 480 may conform to the shape of the grip socket portion of the stylus socket of the housing 490 (e.g., via deformation). FIG. 4 also shows the stylus socket of the housing 490 as including a shaft socket portion with a cross-sectional dimension ($D_5$) for receiving a shaft portion of a stylus.

In a top view of a portion of the housing 490, various circles are shown using dashed lines to indicate how the cross-sectional dimension ($D_1$) of the grip 480 in its deployed state may exceed a depth dimension ($D_6$) of the housing 490. In such an approach, the depth of a housing may be less than a cross-sectional dimension of a deployed grip where the cross-sectional dimension of the deployed grip helps to enhance stylus ergonomics (see, e.g., the stylus 360 and the grip 380 of FIG. 3).

Figure 5:
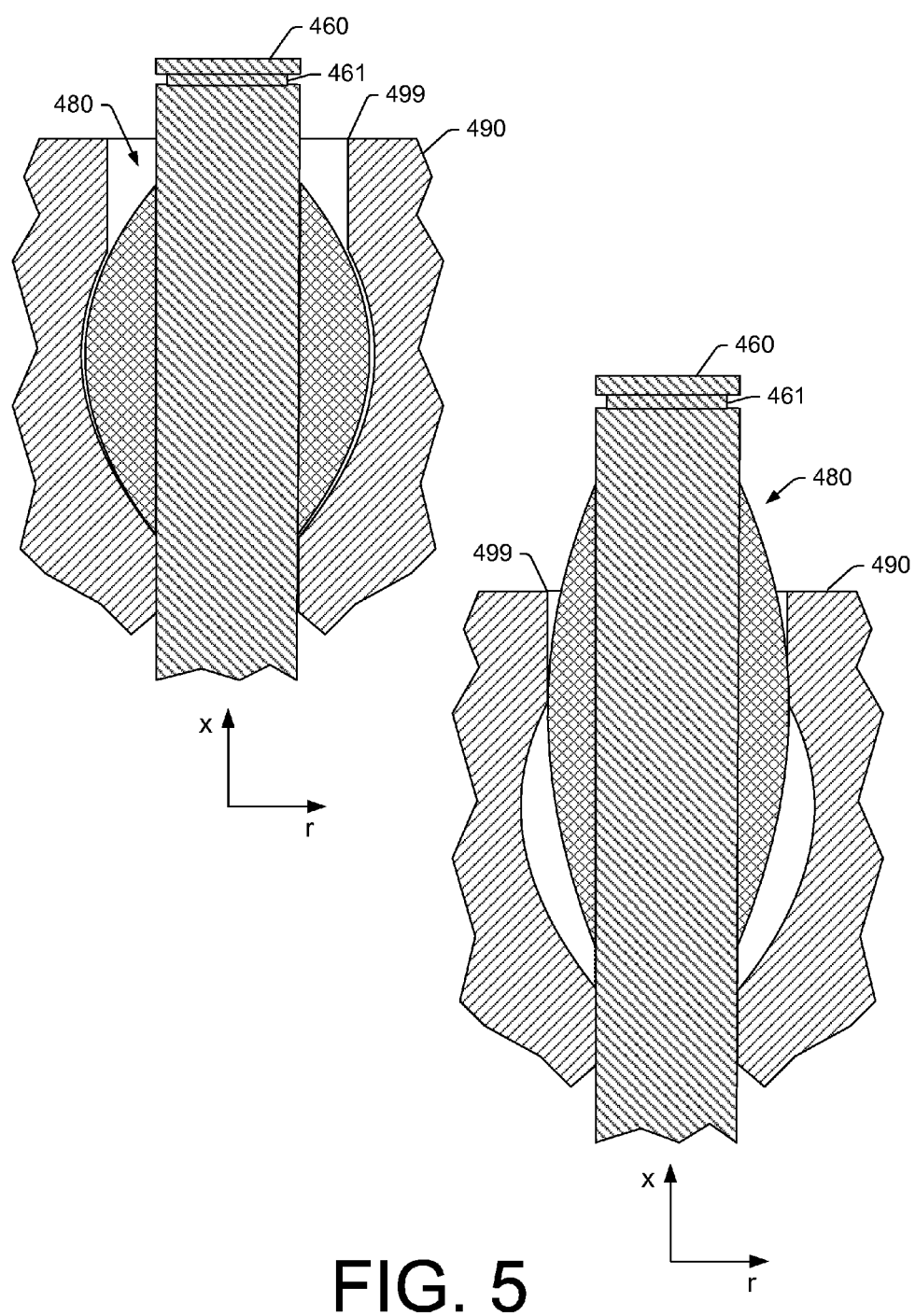
FIG. 5 is a series of diagrams of the stylus grip and the housing of FIG. 4 along with a stylus.

FIG. 5 shows two cross-sectional views of the grip 480 and the housing 490 of FIG. 4 along with a stylus 460 where one of the cross-sectional views shows the stylus 460 with the grip 480 being docked in the housing 490 and where the other of the cross-sectional views shows the stylus 460 with the grip 480 being partially inserted into the housing 490, for example, as may occur during inserting or removing the stylus 460 from the housing 490 (e.g., from a stylus socket of the housing 490). Accordingly, the grip 480, as mounted on the stylus 460, may deform during an insertion process or a removal process.

As an example, an amount of axial force may be applied to an end of the stylus 460 to insert or remove the stylus 460 while deforming the grip 480. As an example, the stylus 460 may include a notch or groove 461 (e.g., or other feature) to facilitate grasping by a finger (e.g., a finger nail, etc.), for example, to assist with a removal process to remove the stylus 460 from a stylus socket of a housing such as the housing 490.

As an example, by providing a stylus socket with an opening narrower than a grip socket portion, a deformable grip may help to retain a stylus in the stylus socket. In such an example, the grip may perform multiple functions, i.e., a retention function (e.g., for storage) and an ergonomic function (e.g., for use).

Figure 6:
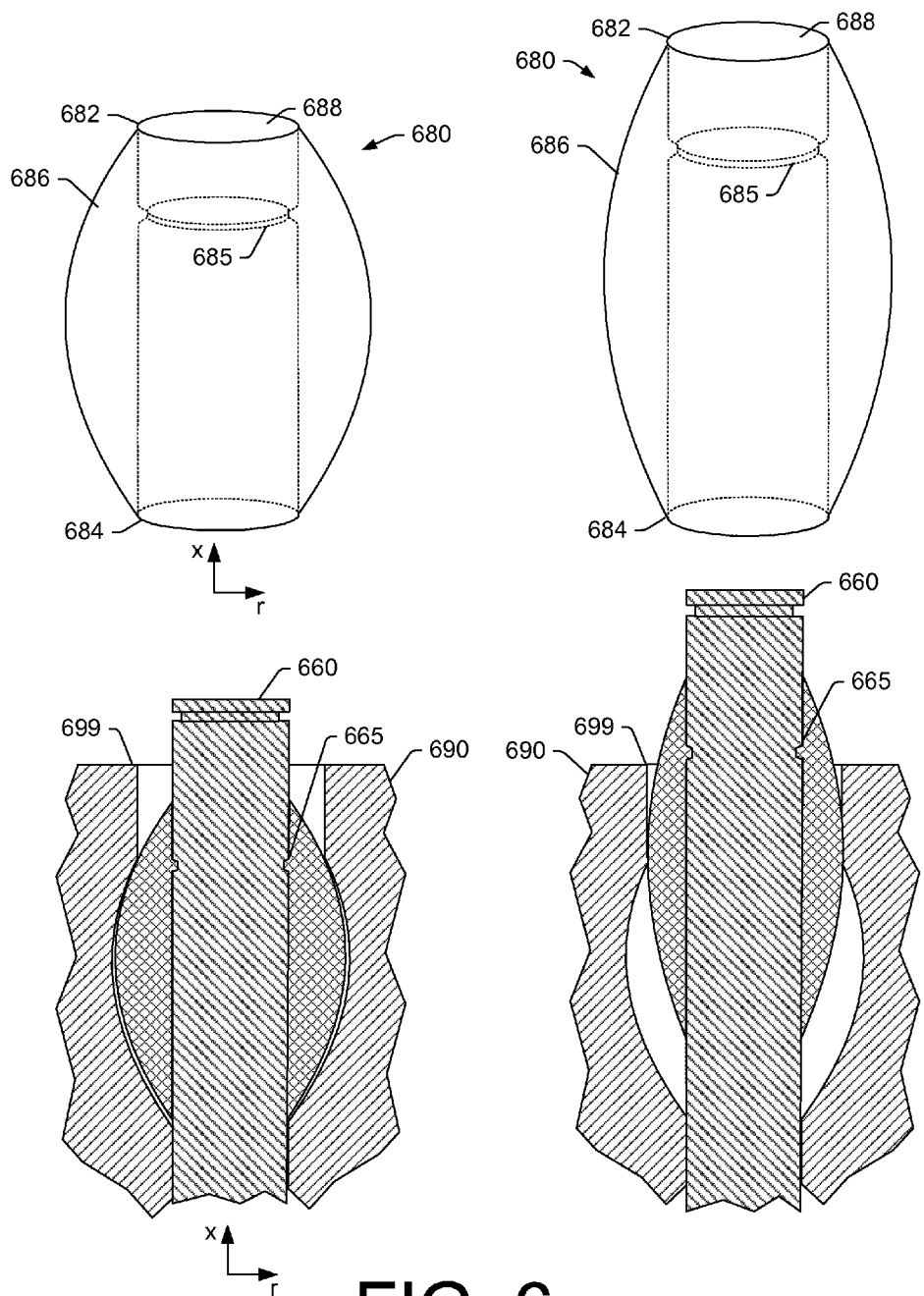
FIG. 6 is a series of diagrams of an example of a grip, an example of a stylus and an example of a housing.

FIG. 6 shows an example of a stylus 660, an example of a grip 680 and an example of a housing 690 that includes a stylus socket with an opening 699. As shown, the grip 680 includes opposing axial ends 682 and 684, an outer surface 686 and an inner surface 688. As shown, the grip 680 is deformable such that lengthening (e.g., stretching) of the grip 680 along an axial dimension (x) causes the grip 680 to contract along a radial dimension (r). As shown, the grip 680 also includes a neck 685 that extends a radial dimension inwardly from the inner surface 688 and the stylus 660 includes an annular groove 665 that may seat the neck 685. As an example, where the neck 685 of the grip 680 is at least partially seated in the annular groove 665 of the stylus 660, force of a removal process may not be sufficient to dislocate the neck 685 from the annular groove 665. In other words, the neck 685 and the annular groove 665 may act to "lock" the axial location of the grip 680 with respect to the stylus 660 where a user may then overcome the lock by manually sliding (e.g., translating) the grip 680 toward a tip end of the stylus 660 (e.g., to an ergonomically comfortable position).

As an example, a stylus may include an annular groove located near a tip end of the stylus such that upon removal of the stylus from a stylus socket, the stylus slides with respect to the grip (e.g., as retained in a grip socket portion of the stylus socket) until the annular groove catches a neck of the grip. In such an example, axial translation of the grip occurs automatically during a removal process. As an example, when inserting the stylus back into the stylus socket, the shape of the stylus socket may cause decoupling of the neck and annular groove such that the grip seats into a grip socket portion while a shaft portion of the stylus slides through the grip and into a shaft socket portion of the stylus socket.

Figure 7:
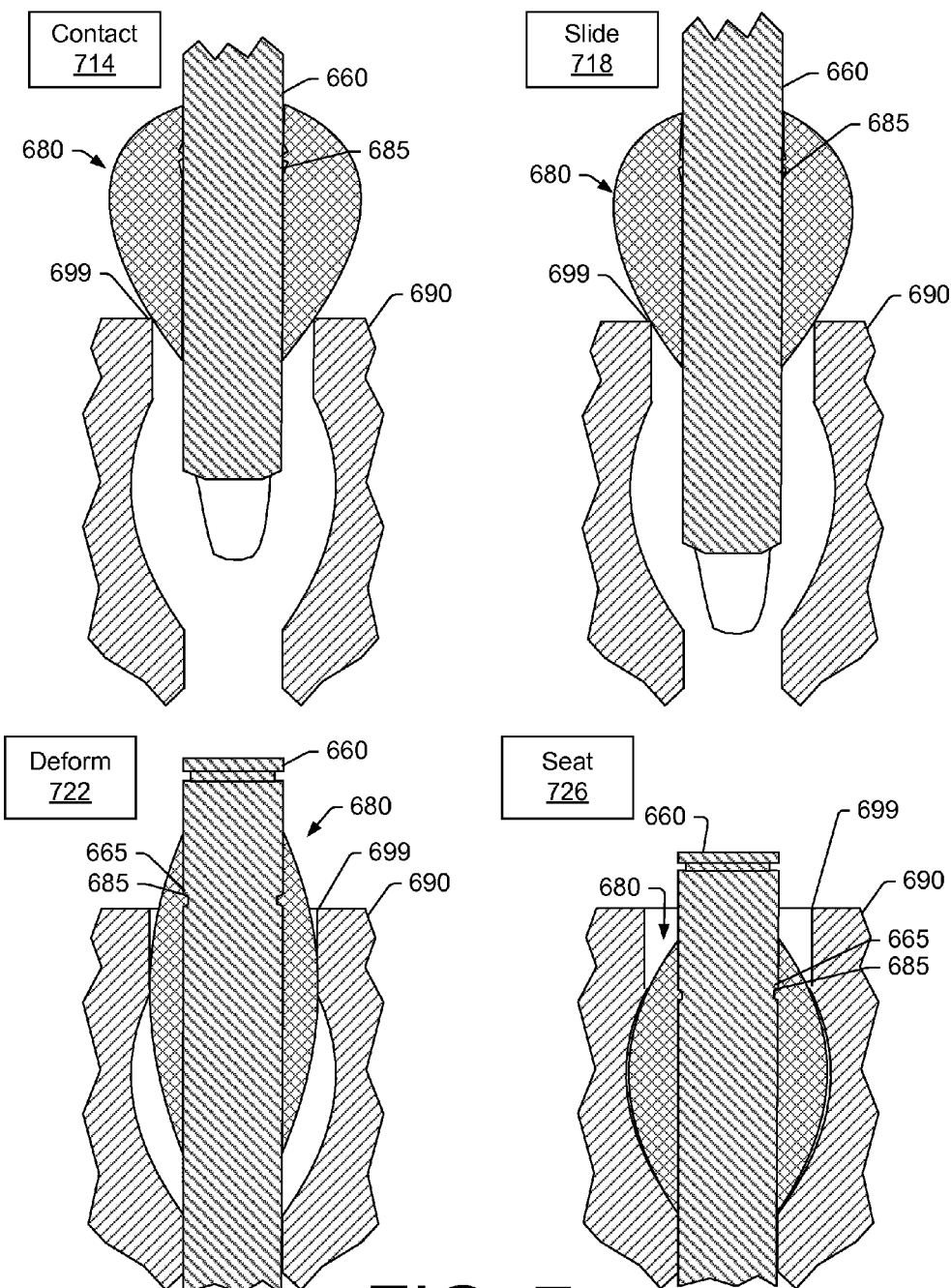
FIG. 7 is a series of diagrams of the grip, the stylus and the housing of FIG. 6 that illustrate an example of a method.

FIG. 7 shows an example of a method 700 with respect to a series of cross-sectional views of the stylus 660, the grip 680 and the housing 690 of FIG. 6. As shown, the method 700 can include a contact block 714 for contacting the grip 680 and the housing 690 by inserting a tip end of the stylus 660 into the opening 699 of the stylus socket of the housing 690. Upon contacting, per a slide block 718, sliding may occur of the stylus 660 with respect to the grip 680. Such sliding may continue responsive to application of axial force to the stylus 660 until engaging of the neck 685 of the grip 680 and the annular groove 665 of the stylus 660. As shown, a deformation block 722 may provide for deforming the grip 680, for example, as facilitated by engagement of the neck 685 and the annular groove 665 followed by, per a seat block 726, seating of the grip 680 in a grip socket portion of the stylus socket of the housing 690. In such an example, the process of inserting the stylus 660 into the stylus socket of the housing 690 acts to automatically translate the grip 680 along the stylus 660.

As an example, as mentioned, depending on configuration of various features, axial translation of a grip may occur automatically during a removal process. For example, a grip may remain seated in a grip socket portion of a stylus socket until a neck engages an annular groove of a stylus such that upon removal of the stylus from the stylus socket the grip is axially located at an ergonomically acceptable position.

Figure 8:
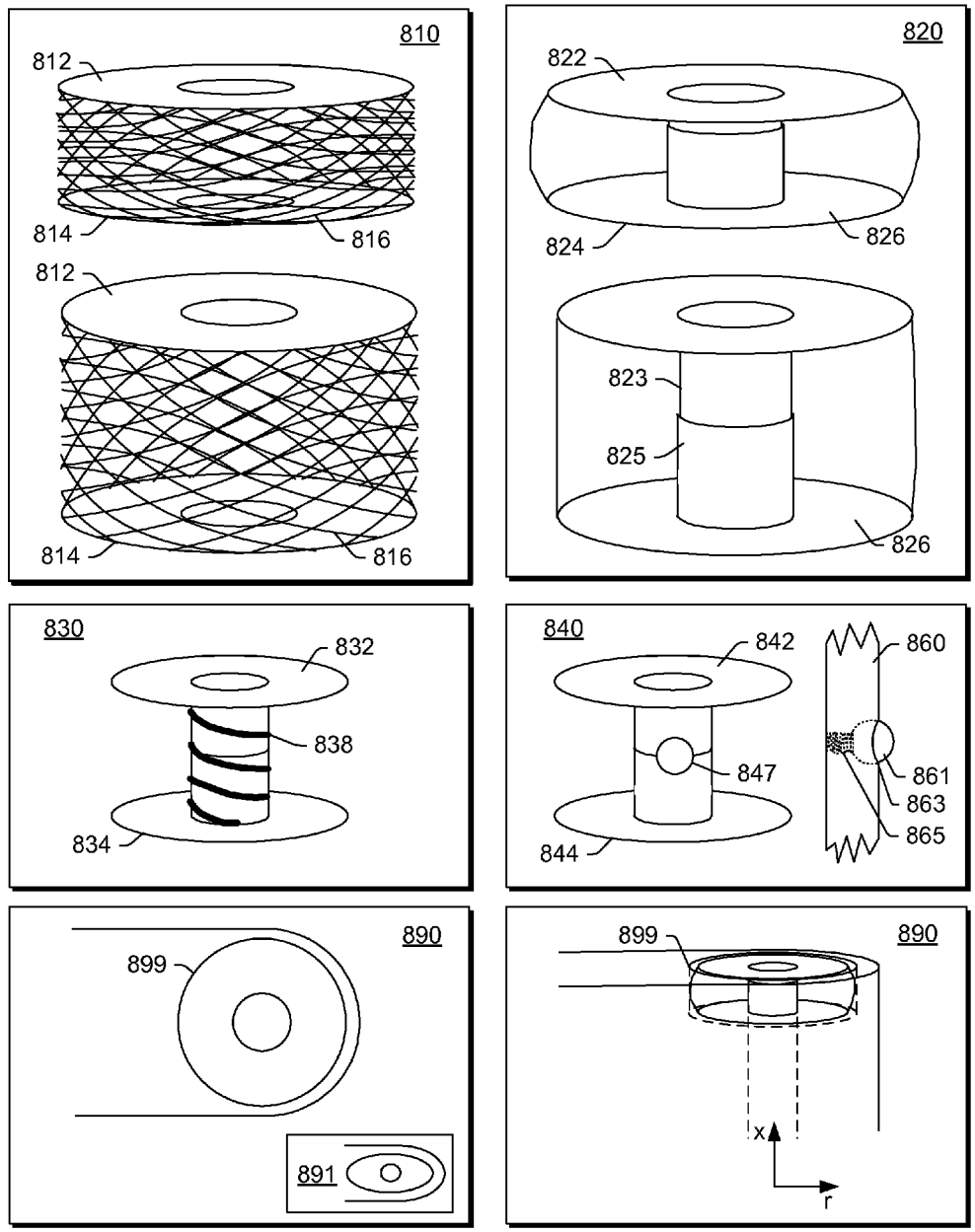
FIG. 8 is a series of diagrams of examples of grips and examples of housings.

FIG. 8 shows various examples of grips 810, 820, 830 and 840, an example of a stylus 860 and examples of housings 890 and 891.

As shown in FIG. 8, the grip 810 includes end caps 812 and 814 and a mesh 816 coupled to the end caps 812 and 814. As an example, the mesh 816 may have a spring constant and may apply a biasing force to the end caps 812 and 814. For example, the mesh 816 may act to force the end caps 812 and 814 axially away from each other to expand the mesh 816 in a deployed state. In such an example, the mesh 816 may form a grip structure for gripping a stylus.

As shown in FIG. 8, the grip 820 includes end caps 822 and 824 and a deformable material 826 (or materials) disposed between the end caps 822 and 824. As an example, the end caps 822 and 824 may be configured for nesting, for example, where an axial distance between the ends caps 822 and 824 may be adjustable (e.g., shortened or lengthened) via nesting cylindrical portions 823 and 825 of the end caps 822 and 824, respectively. In such an example, the deformable material 826 may expand and contract depending on the axial distance between the end caps 822 and 824 and provide, in a deployed state, a surface for gripping a stylus.

As shown in FIG. 8, the grip 830 includes end caps 832 and 834 and a spring 838 disposed between the end caps 832 and 834. As an example, the end caps 832 and 834 may be configured for nesting, for example, where an axial distance between the ends caps 832 and 834 may be adjustable (e.g., shortened or lengthened). In such an example, the spring 838 may apply a biasing force to the end caps 832 and 834. The grip 830 may include deformable material, a surface, a mesh, etc. disposed between the end caps 832 and 834 such that the spring 838 forces the end caps 832 and 834 axially away from each other to form a grip structure (e.g., in a deployed state).

As shown in FIG. 8, the grip 840 includes end caps 842 and 844 and an opening 847, for example, formed partially in each of the end caps 842 and 844. As an example, the stylus 860 may include a ball 861 biased with respect to an opening 863 by a spring 865. In such an example, the ball 861 may act to force the end caps 842 and 844 away from each other (e.g., in a deployed state) to expand a material disposed between the end caps 842 and 844 that forms a grip structure. Upon application of force to the end caps 842 and 844, the opening 847 may close, for example, as the end caps 842 and 844 nest with respect to each other (e.g., a portion of one end cap slides axially into a portion of the other end cap).

As shown in FIG. 8, the housing 890 includes an opening 899 to a grip socket portion of a stylus socket. As an example, the grip socket portion of the stylus socket of the housing 890 may seat a collapsed grip of a stylus (e.g., in a docked state). Such a grip may include end caps with a material or materials disposed therebetween, which, when deployed, forms a grip structure for a stylus. As an example, as shown in FIG. 8, a housing 891 may include an oval shape opening (e.g., grip socket portion), for example, defined by a short axis oriented along a depth dimension of the housing 891 and a long axis oriented along a width dimension of the housing 891. In such an example, a grip may be conformable to the oval shape (e.g., or other elongated shape) such that it can reduce its cross-sectional dimension along a depth of the housing 891. As an example, a grip may be deformable to a grip shape for gripping and to a docked shape for docking (e.g., storage) where such shapes differ in at least a cross-sectional dimension (e.g., a dimension corresponding to a depth of a housing). As an example, a grip socket portion may include a flat floor, a domed floor, etc. to accommodate a grip in a docked state.

As an example, a grip may include a slider portion that acts to carry grip material. For example, a slider may carry grip material and be able to expand and contract as well as slide along a stylus shaft. As an example, a slider portion may include end caps as well as a tunnel, for example, where the end caps act to retain grip material therebetween. As an example, end caps may be mushroom shaped (e.g., domed), flat, circular, oval, etc. As mentioned, end caps may nest, interlock, etc. to facilitate deployment of grip material, docking of grip material, etc. As an example, a stylus may include one or more stops or stopping mechanisms, for example, to limit axial translation of a grip along a stylus. As an example, an end of a stylus may include a stop with a diameter or other cross-sectional dimension that exceeds that of a tunnel of a grip.

As an example, an apparatus can include a processor; memory operatively coupled to the processor; a touchscreen display operatively coupled to the processor; a stylus that includes a first axial end, a second axial end and an axially translatable grip; and a housing that includes a stylus socket for docking the stylus. In such an example, the stylus socket can include a socket diameter and the grip can include a free standing diameter that exceeds the socket diameter. As an example, a housing can include a depth and a grip can include a free standing diameter that exceeds the depth of the housing. As an example, a grip can include a free standing axial length and a docked axial length, for example, where the docked axial length exceeds the free standing axial length.

As an example, a grip may be a unitary piece, for example, formed of an elastomeric material (e.g., an elastomer). As an example, a grip may include a deformable shell that contains material (e.g., fluid, gel, gas, paste, solids, etc.). As an example, a grip may be made of multiple pieces. As an example, a grip may include nesting pieces where, for example, a spring or other biasing mechanism may apply a biasing force to the nesting pieces.

As an example, a housing may include a stylus socket that includes a shaft socket portion and a grip socket portion. In such an example, a cross-sectional dimension of the grip socket portion may exceed a cross-sectional dimension of the shaft socket portion. As an example, a grip socket portion may be defined by a wall or wall, which may, for example, include a surface or surfaces that can contact a grip. In such an example, an outer surface of the grip may exert a force against such a surface or surface, for example, to help retain a stylus in the stylus socket of the housing.

As an example, a stylus may include an annular groove and a grip may include an inner neck, for example, where the inner neck may be at least partially seatable in the annular groove. Such features may optionally be part of a locating mechanism to locate the grip with respect to the stylus, for example, for ergonomically acceptable use of the grip for gripping and manipulating the stylus.

As an example, an apparatus may include a touchscreen display that includes an electromagnetic grid and a stylus may include circuitry for interacting with the electromagnetic grid. In such an example, the stylus may include one or more buttons, actuators, etc. As an example, a grip may be positionable on a stylus to avoid interference with a button, an actuator, etc.

As an example, a housing may include a length, a width and a depth where, for example, the depth is less than approximately 10 mm. As an example, consider a housing with a depth of about 7 mm or less where the housing includes a stylus socket for docking a stylus with an expandable grip that can expand to a diameter greater than about 7 mm. In such an example, the expandable grip may enhance ergonomics by providing a gripping structure to facilitate user manipulation of the stylus.

As an example, a tablet computing device can include a processor; memory operatively coupled to the processor; a display; display driver circuitry operatively coupled to the processor; an electromagnetic digitizer grid; electromagnetic digitizer circuitry operatively coupled to the processor; a stylus that includes circuitry configured to interact with the electromagnetic digitizer grid, a first axial end, a second axial end and an axially translatable grip; and a housing that includes a stylus socket for docking the stylus. In such an example, the grip may be a deformable grip. As an example, a grip may include a free standing cross-sectional dimension (e.g., in a deployed state) that exceeds a depth of the housing.

As an example, a method can include providing a computing device that includes a stylus socket where the stylus socket includes a grip socket portion and a stylus shaft socket portion; providing a stylus in the stylus socket where the stylus includes a deformable and axially translatable grip; applying force by the deformable grip to the grip socket portion of the stylus socket; and retaining the stylus in the stylus socket of the computing device via the applied force. In such an example, the method may further include applying an axial force to the stylus for removal of the stylus from the stylus socket of the computing device. As an example, such a method may cause translation of the stylus with respect to the grip.

As an example, a method may include removing a stylus from a stylus socket and applying an axial force to the stylus while re-inserting the stylus into the stylus socket where the application of the axial force causes axial translation of the stylus with respect to the grip.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 9:
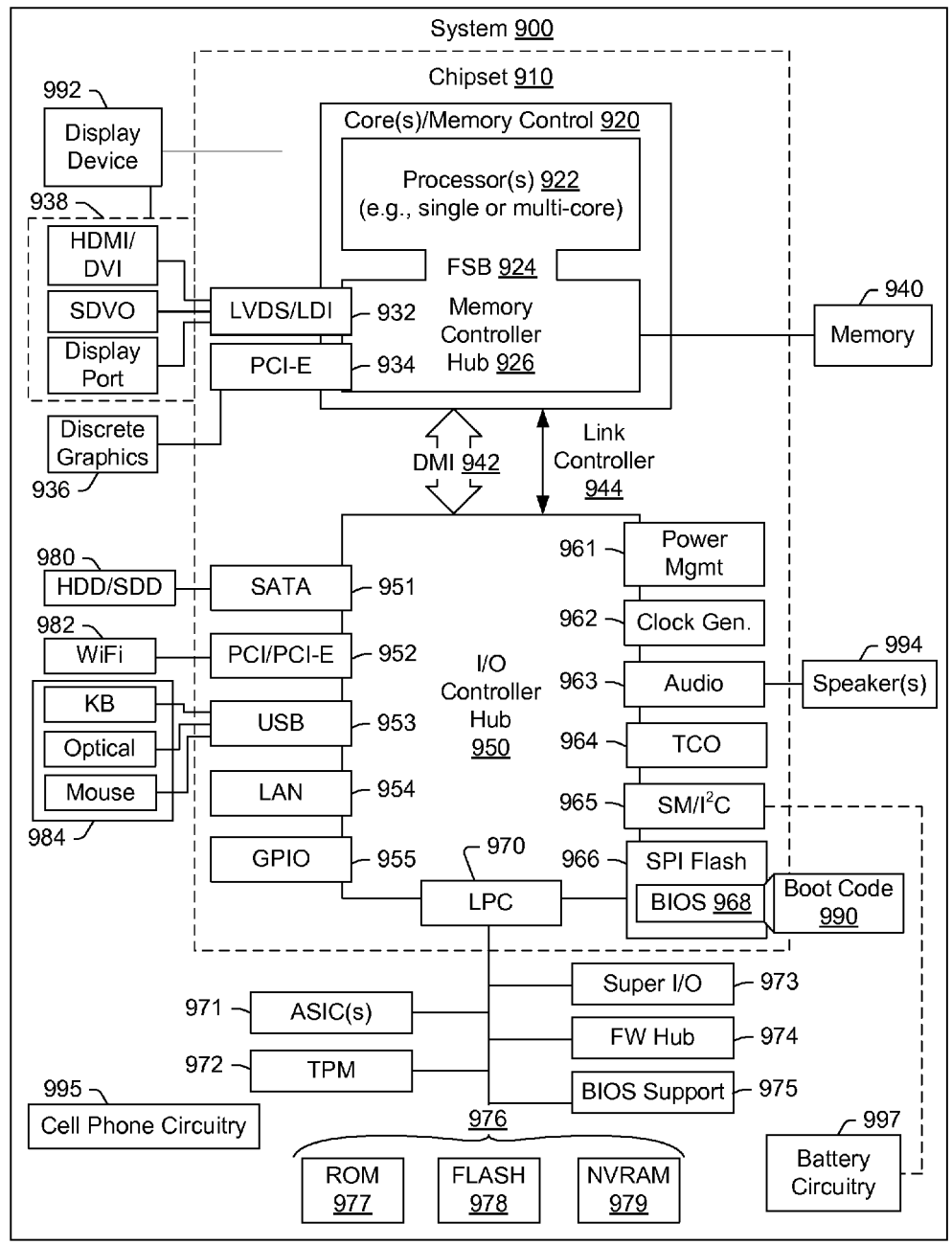
FIG. 9 is a diagram of an example of a system that includes one or more processors.

FIG. 9 depicts a block diagram of an illustrative computer system 900. The system 900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C. As an example, a system such as one of the systems of the various figures may be configured to operate as a power adapter for an information handling system that may include at least some of the features of the system 900.

As shown in FIG. 9, the system 900 includes a so-called chipset 910. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 9, the chipset 910 has a particular architecture, which may vary to some extent depending on brand or manufacturer. The architecture of the chipset 910 includes a core and memory control group 920 and an I/O controller hub 950 that exchange information (e.g., data, signals, commands, etc.) via, for example, a direct management interface or direct media interface (DMI) 942 or a link controller 944. In the example of FIG. 9, the DMI 942 is a chip-to-chip interface (sometimes referred to as being a link between a "northbridge" and a "southbridge").

The core and memory control group 920 include one or more processors 922 (e.g., single core or multi-core) and a memory controller hub 926 that exchange information via a front side bus (FSB) 924. As described herein, various components of the core and memory control group 920 may be integrated onto a single processor die, for example, to make a chip that supplants the conventional "northbridge" style architecture.

The memory controller hub 926 interfaces with memory 940. For example, the memory controller hub 926 may provide support for DDR SDRAM memory (e.g., DDR, DDR2, DDR3, etc.). In general, the memory 940 is a type of random-access memory (RAM). It is often referred to as "system memory".

The memory controller hub 926 further includes a low-voltage differential signaling interface (LVDS) 932. The LVDS 932 may be a so-called LVDS Display Interface (LDI) for support of a display device 992 (e.g., a CRT, a flat panel, a projector, etc.). A block 938 includes some examples of technologies that may be supported via the LVDS interface 932 (e.g., serial digital video, HDMI/DVI, display port). The memory controller hub 926 also includes one or more PCI-express interfaces (PCI-E) 934, for example, for support of discrete graphics 936. Discrete graphics using a PCI-E interface has become an alternative approach to an accelerated graphics port (AGP). For example, the memory controller hub 926 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 950 includes a variety of interfaces. The example of FIG. 9 includes a SATA interface 951, one or more PCI-E interfaces 952 (optionally one or more legacy PCI interfaces), one or more USB interfaces 953, a LAN interface 954 (more generally a network interface), a general purpose I/O interface (GPIO) 955, a low-pin count (LPC) interface 970, a power management interface 961, a clock generator interface 962, an audio interface 963 (e.g., for speakers 994), a total cost of operation (TCO) interface 964, a system management bus interface (e.g., a multi-master serial computer bus interface) 965, and a serial peripheral flash memory/controller interface (SPI Flash) 966, which, in the example of FIG. 9, includes BIOS 968 and boot code 990. With respect to network connections, the I/O hub controller 950 may include integrated gigabit Ethernet controller lines multiplexed with a PCI-E interface port. Other network features may operate independent of a PCI-E interface.

The interfaces of the I/O hub controller 950 provide for communication with various devices, networks, etc. For example, the SATA interface 951 provides for reading, writing or reading and writing information on one or more drives 980 such as HDDs, SDDs or a combination thereof. The I/O hub controller 950 may also include an advanced host controller interface (AHCI) to support one or more drives 980. The PCI-E interface 952 allows for wireless connections 982 to devices, networks, etc. The USB interface 953 provides for input devices 984 such as keyboards (KB), one or more optical sensors, mice and various other devices (e.g., microphones, cameras, phones, storage, media players, etc.). On or more other types of sensors may optionally rely on the USB interface 953 or another interface (e.g., I$^2$C, etc.). As to microphones, the system 900 of FIG. 9 may include hardware (e.g., audio card) appropriately configured for receipt of sound (e.g., user voice, ambient sound, etc.).

In the example of FIG. 9, the LPC interface 970 provides for use of one or more ASICs 971, a trusted platform module (TPM) 972, a super I/O 973, a firmware hub 974, BIOS support 975 as well as various types of memory 976 such as ROM 977, Flash 978, and non-volatile RAM (NVRAM) 979. With respect to the TPM 972, this module may be in the form of a chip that can be used to authenticate software and hardware devices. For example, a TPM may be capable of performing platform authentication and may be used to verify that a system seeking access is the expected system.

The system 900, upon power on, may be configured to execute boot code 990 for the BIOS 968, as stored within the SPI Flash 966, and thereafter processes data under the control of one or more operating systems and application software (e.g., stored in system memory 940). An operating system may be stored in any of a variety of locations and accessed, for example, according to instructions of the BIOS 968. As an example, a machine may include fewer or more features than shown in the system 900 of FIG. 9. Further, the system 900 of FIG. 9 is shown as optionally including cell phone circuitry 995, which may include GSM, CDMA, etc., types of circuitry configured for coordinated operation with one or more of the other features of the system 900. Also shown in FIG. 9 is battery circuitry 997, which may provide one or more battery, power, etc., associated features (e.g., optionally to instruct one or more other components of the system 900). As mentioned, a SMBus may be operable via a LPC (see, e.g., the LPC interface 970), via an I$^2$C interface (see, e.g., the SM/I$^2$C interface 965), etc.

Conclusion

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
a processor;
memory operatively coupled to the processor;
a touchscreen display operatively coupled to the processor;
a stylus that comprises a first axial end, a second axial end and a grip that is axially translatable and deformable; and
a housing that comprises a stylus socket that comprises a shaft portion and a grip portion wherein the grip portion comprises a maximum cross-sectional area that exceeds a cross-sectional area of the shaft portion, wherein the grip comprises a free standing maximum cross-sectional area that exceeds the maximum cross-sectional area of the grip portion, and wherein, in a docked state of the stylus, the grip portion seats the grip in the stylus socket of the housing.

2. The apparatus of claim 1 wherein the housing comprises a depth and wherein the a maximum dimension of the free standing maximum cross-sectional area of the grip exceeds the depth of the housing.

3. The apparatus of claim 1 wherein the grip comprises a free standing axial length and a docked axial length and wherein the docked axial length exceeds the free standing axial length.

4. The apparatus of claim 1 wherein the grip comprises a unitary piece.

5. The apparatus of claim 1 wherein the grip comprises a shell that contains material.

6. The apparatus of claim 1 wherein the grip comprises multiple pieces.

7. The apparatus of claim 6 wherein the grip comprises two pieces and a spring that applies a biasing force to the two pieces.

8. The apparatus of claim 1 wherein the grip comprises an elastomer.

9. The apparatus of claim 1 wherein the stylus comprises an annular groove and wherein the grip comprises an inner neck, the inner neck being at least partially seatable in the annular groove.

10. The apparatus of claim 1 wherein the touchscreen display comprises an electromagnetic grid and wherein the stylus comprises circuitry for interacting with the electromagnetic grid.

11. The apparatus of claim 1 wherein the housing comprises a length, a width and a depth wherein the depth is less than approximately 10 mm.

12. The apparatus of claim 1 wherein the stylus socket comprises an opening that comprises a cross-sectional area that is less than the maximum cross-sectional area of the grip portion and greater than the cross-sectional area of the shaft portion and wherein the grip portion is disposed axially between the opening and the shaft portion.

13. A tablet computing device comprising:
a processor;
memory operatively coupled to the processor;
a display;
display driver circuitry operatively coupled to the processor;
an electromagnetic digitizer grid;
electromagnetic digitizer circuitry operatively coupled to the processor;
a stylus that comprises circuitry that interacts with the electromagnetic digitizer grid, a first axial end, a second axial end and a grip that is axially translatable and deformable; and
a housing that comprises a stylus socket that comprises a shaft portion and a grip portion wherein the grip portion comprises a maximum cross-sectional area that exceeds a cross-sectional area of the shaft portion, wherein the grip comprises a free standing maximum cross-sectional area that exceeds the maximum cross-sectional area of the grip portion, and wherein, in a docked state of the stylus, the grip portion seats the grip in the stylus socket of the housing.

14. The tablet computing device of claim 13 wherein a maximum dimension of the free standing maximum cross-sectional area of the grip exceeds a depth of the housing.

15. A method comprising:
in an assembly that comprises
a computing device that comprises a stylus socket that comprises a grip portion and a shaft portion wherein the grip portion comprises a maximum cross-sectional area that exceeds a cross-sectional area of the shaft portion, and
a stylus that comprises a grip that is deformable and axially translatable disposed in the stylus socket wherein the grip comprises a free standing maximum cross-sectional area that exceeds the maximum cross-sectional area of the grip portion;
applying force by the grip to the grip portion of the stylus socket; and
retaining the stylus in the stylus socket of the computing device via the applied force.

16. The method of claim 15 further comprising applying an axial force to the stylus for removal of the stylus from the stylus socket of the computing device.

17. The method of claim 16 wherein the application of the axial force causes axial translation of the stylus with respect to the grip.

18. The method of claim 16 further comprising removing the stylus from the stylus socket and applying an axial force to the stylus while re-inserting the stylus into the stylus socket wherein the application of the axial force causes axial translation of the stylus with respect to the grip.

* * * * *